US008411364B2

(12) United States Patent
Fox et al.

(10) Patent No.: US 8,411,364 B2

(45) Date of Patent: Apr. 2, 2013

(54) SECURITY DOCUMENT WITH MICRO-PRISMS

(75) Inventors: Phillip John Fox, South Melbourne (AU); Wayne Keven Jackson, Rosanna (AU)

(73) Assignee: Reserve Bank of Australia, Sydney, New South Wales (AU)

( * ) Notice: Subject to any disclaimer, the term of this patent is extended or adjusted under 35 U.S.C. 154(b) by 285 days.

(21) Appl. No.: 12/444,469

(22) PCT Filed: Oct. 10, 2007

(86) PCT No.: PCT/AU2007/001531

§ 371 (c)(1),
(2), (4) Date: Oct. 30, 2009

(87) PCT Pub. No.: WO2008/043139

PCT Pub. Date: Apr. 17, 2008

(65) Prior Publication Data

US 2010/0060989 A1 Mar. 11, 2010

(30) Foreign Application Priority Data

Oct. 12, 2006 (AU) ................................ 2006905679

(51) Int. Cl.
*G02B 27/10* (2006.01)

(52) U.S. Cl. ........................................................ 359/625

(58) Field of Classification Search ................... 359/625
See application file for complete search history.

(56) References Cited

U.S. PATENT DOCUMENTS

| | | | | |
|---|---|---|---|---|
| 5,106,125 | A | 4/1992 | Antes | |
| 6,835,934 | B2 | 12/2004 | Nemeth et al. | |
| 6,975,438 | B2 | 12/2005 | Schilling et al. | |
| 7,876,489 | B2 * | 1/2011 | Gandhi et al. | 359/242 |
| 2005/0185279 | A1 * | 8/2005 | Mullen et al. | 359/530 |
| 2008/0088905 | A1 * | 4/2008 | Mimura et al. | 359/227 |
| 2009/0237791 | A1 * | 9/2009 | Nilsen | 359/530 |

FOREIGN PATENT DOCUMENTS

WO WO 2004/062942 A1 7/2004

* cited by examiner

*Primary Examiner* — James Jones

(74) *Attorney, Agent, or Firm* — Greer, Burns & Crain, Ltd.

(57) ABSTRACT

A security document including a substrate of transparent polymeric material, and opacifying layers provided on opposing sides of the substrate, the opacifying layers acting to guide light propagating within the substrate, wherein the substrate is formed with at least one micro-prism for diverting light propagating within or entering the substrate.

26 Claims, 2 Drawing Sheets

SECURITY DOCUMENT WITH MICRO-PRISMS

FIELD OF THE INVENTION

The present invention relates to security documents, and in particular to security documents including a sheet-like substrate of transparent plastics material. The present invention is particularly concerned with providing a security document with a security device which is visually detectable in order to verify the authenticity of the security document.

BACKGROUND OF THE INVENTION

As used herein, the term "security document" refers to any type of document or token for which authenticity is important, and includes within its scope identification documents and tokens of value such as bank notes, cheques, traveller's cheques, credit cards, identity cards, passports, travel documents, tickets, and the like.

A wide variety of security devices for security documents have previously been proposed. Such security devices are provided in order to make falsification and counterfeiting of security documents difficult. Many of those considered effective require the use of equipment which detects and analyses the characteristics of a light beam reflected from the security document to verify the authenticity of the security document. Accordingly, only persons possessing the necessary verification equipment are able to verify the authenticity of the security document.

It would therefore be desirable to provide a security document which enables verification of the authenticity of the security document in a simple and convenient manner without verification equipment.

SUMMARY OF THE INVENTION

According to one aspect of the invention, there is provided a security document including a substrate of transparent polymeric material, and opacifying layers provided on opposing sides of the substrate, the opacifying layers acting to guide light propagating within the substrate, wherein the substrate is formed with at least one micro-prism for diverting light propagating within or entering the substrate.

Preferably, the substrate is formed with a plurality of micro-prisms and the opacifying layer on one side of the substrate only partially covers the substrate to form a window.

In a preferred embodiment, the opacifying layer on the opposing side of the substrate only partially covers the substrate to leave an uncovered zone. The substrate within the uncovered zone is preferably formed with the plurality of micro-prisms.

In a particularly preferred embodiment, the window overlies the uncovered zone and one or more of the micro-prisms are arranged to divert light propagating within the substrate out of the window.

In a particularly preferred embodiment each micro-prism includes an inclined first face and a second face. The inclined first face is at an acute angle with respect to the opposing sides of the substrate. The acute angle may range from about 30 degrees to about 60 degrees, but preferably, the acute angle is about 45 degrees and the inclined first face provides a first interface between the substrate and the air surrounding of the security document. The second or rear face is preferably perpendicular to the opposing sides of the substrate and provides a second interface between the surrounding air and the substrate.

Preferably, light propagating within the substrate, which is incident on the inclined face at an angle greater than a critical angle, is reflected at the first interface. In contrast, light propagating within the substrate, which is incident on the inclined face at an angle less than the critical angle, is refracted away from the normal of the first interface and towards the second or rear face of the micro-prism.

In a particularly preferred embodiment, light refracted towards the rear face of the micro-prism, which is incident on the rear face, is refracted towards the normal of the second interface. Thus, light refracted at the second interface of the micro-prism propagates within the substrate in a direction which is substantially parallel to the opposing sides of the substrate, so that it arrives at the inclined face of the next micro-prism, at an angle greater than the critical angle so that it is reflected.

The micro-prisms can therefore increase the amount of light transmitted out of specific areas of the security document, e.g. the window. This can provide a contrast enhancement between specific areas of the security document and remaining areas which are usually printed with indicia. The window with micro-prisms can serve as an overt security device which is visible to provide verification of authenticity of the security document and which is difficult to counterfeit unless the counterfeiter has the appropriate tools for embossing or otherwise forming the micro-prisms in a transparent plastics substrate.

In an alternative embodiment, the micro-prisms may be arranged to direct light incident on the window to propagate along the substrate and out of an edge of the substrate.

The increase in light emission caused by the micro-prisms, either out of the window or out of an edge of the substrate, may enhance signals received by a detection and analysing apparatus used in a method of determining a characteristic of the security document, such as disclosed in our International Patent Application No. WO 01/50426, the contents of which are incorporated herein by reference. For example, the intensity or integrity of light propagated within the substrate and emitted from the window or from an edge of the substrate may be detected and analysed to determine one or more characteristics of the security document, such as its denomination, whether it is worn or contains faults, or its authenticity. The increase in light emission caused by the micro-prisms can enhance the signals received by the detection and analysing apparatus for better detection and analysis.

According to another aspect of the invention, there is provided a method of manufacturing a security document including: providing a substrate of transparent polymeric material; and deforming the substrate to provide at least one micro prism.

In one preferred method of forming the micro-prism structures, they are formed by embossing the substrate. However, it will be appreciated that they may be formed using other apparatus, such as laser engraving apparatus.

According to a further aspect of the invention, there is provided a method of determining a characteristic of a security document, the method including the steps of:

a) providing a security document in accordance with the first aspect of the invention;

b) projecting light from a light source into the substrate of the security document;

c) detecting a light emission from the security document; and d) analysing one or more characteristics of the light emission to determine a characteristic of the security document.

In a preferred method of determining a characteristic of a security document, the step of detecting the light emission is from a window or edge of the security document.

BRIEF DESCRIPTION OF THE DRAWINGS

A preferred embodiment of the invention will now be described which should not be considered as limiting any of the statements in the previous section. The preferred embodiment will be described with reference to the following figures in which.

DESCRIPTION OF PREFERRED EMBODIMENT

Figure 1:
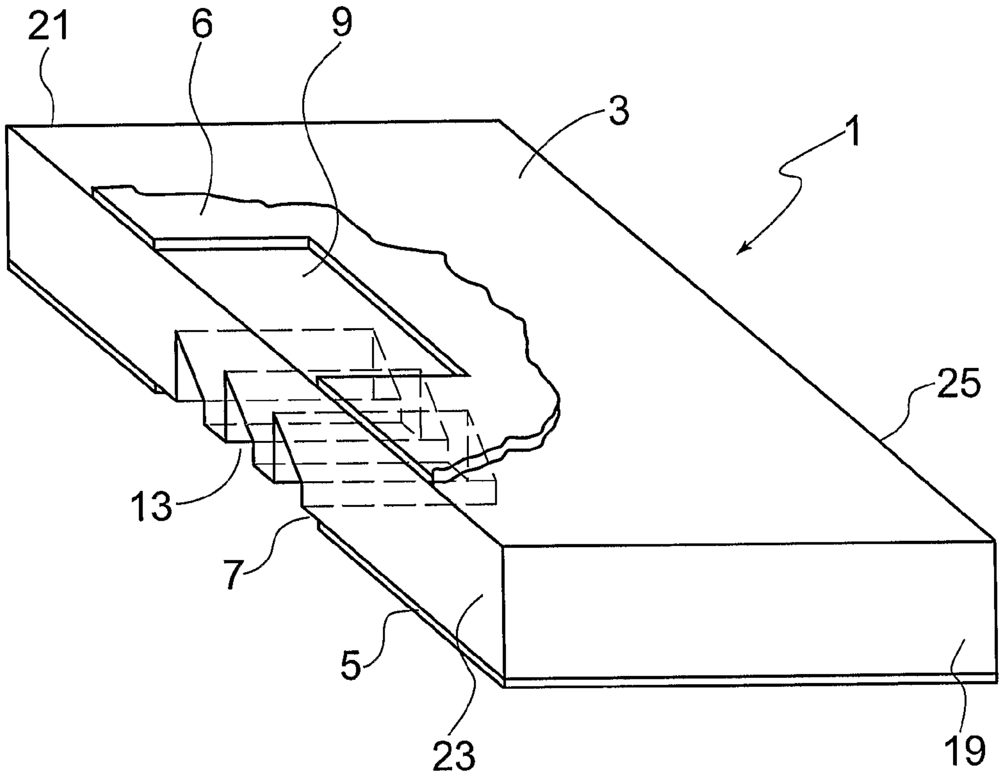
FIG. 1 is a perspective sectional view through a security document according to an embodiment of the invention illustrating opacifying layers on opposing sides of the substrate partially covering the substrate.

With reference to the accompanying drawings there is shown a security document 1 comprising a substrate 3 of transparent polymeric material, such as biaxially oriented polypropylene, and an opacifying layer 5 partially covering the substrate 3 to leave an uncovered zone 7. The security document 1 further includes an additional opacifying layer 6 provided on an opposing side of the substrate 3. The additional opacifying layer 6 only partially covers the substrate 3, leaving an area of the substrate 3 uncovered to form an uncovered portion or "window" 9 which allows light to pass through. In FIG. 1 only a small section of the opacifying layer 6 adjacent to the window 9 is illustrated.

The opacifying layers 5, 6 may comprise any one or more of a variety of opacifying inks which can be used in the printing of security documents, such as bank notes. Alternatively, the opacifying layers 5, 6 could comprise layers of paper or other substantially opaque materials. The opacifying layers 5, 6 form an outer shell which acts as a light guide to direct light incident on an uncovered portion, such as a first end 19 of the substrate 3, through the substrate 3 to exit at another uncovered portion of the security document 1, such as a second end 21 of the substrate 3. Opposing sides of the substrate 3 are also able to guide a certain amount of light within the substrate 3 by total internal reflection without the presence of the opacifying layers 5, 6. In this regard, rather than printing on the opacifying layers 5, 6 to convey information, direct printing on the substrate 3, embossing, laser engraving into the substrate 3, etc can instead be used.

In order to direct light propagating within the substrate 3 out a specific uncovered portion, for example the window 9, the substrate 3 within the uncovered zone 7 is embossed to provide one or more micro-prisms 13. Each micro-prism 13 is structured to redirect a proportion of the light propagating through the substrate 3 towards the window 9. As a result, the micro-prisms 13 function as a security device as the net amount of light transmitted out of the window 9 is increased providing a contrast enhancement visible to the observer.

Figure 2:
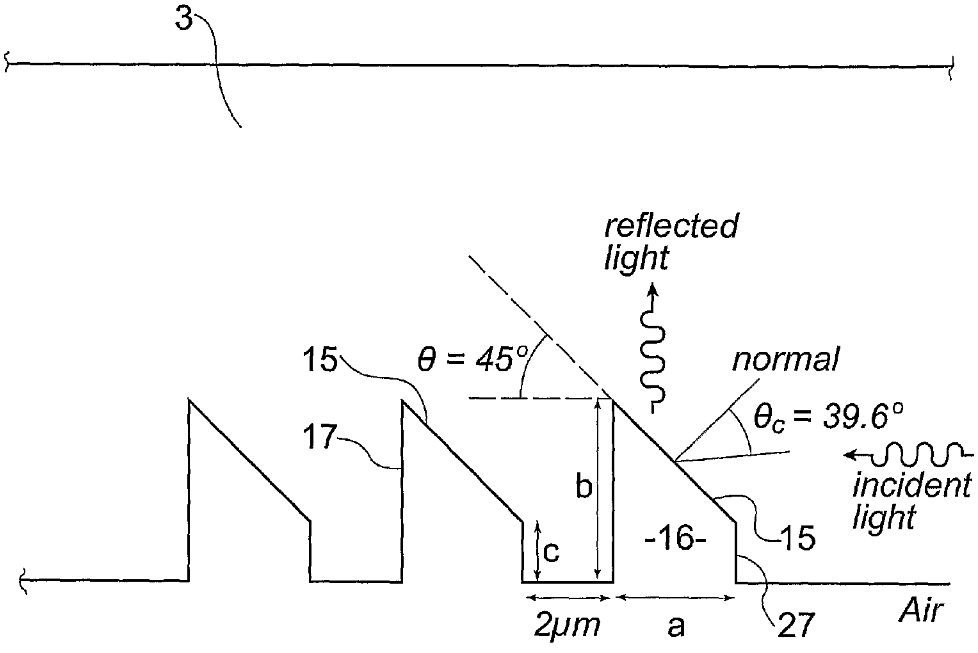
FIG. 2 is a partial side view of the substrate of the security document illustrated in FIG. 1.
Figure 3:
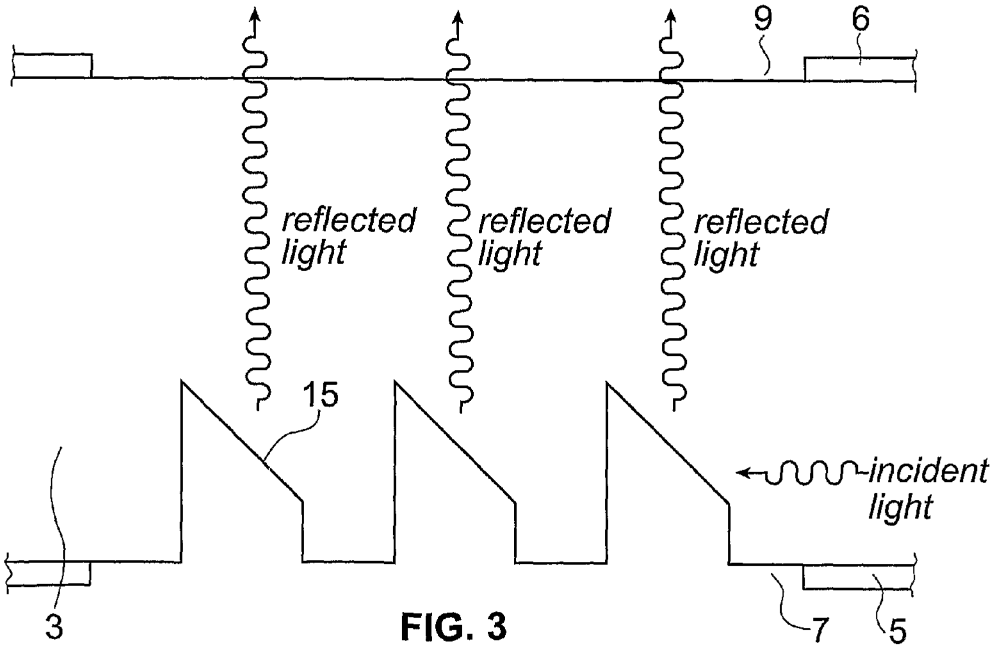
FIG. 3 is a partial side view of the security document illustrated in FIG. 1.

As shown in FIGS. 2 and 3, each micro-prism 13 includes a first, inclined face 15, orientated at a 45 degree angle with respect to the opacifying layers 5, 6; and a second, rear face 17 which is preferably inclined at 45 degrees with respect to the inclined face 15 and perpendicular to the opacifying layers 5, 6. The micro-prisms 13 are evenly spaced preferably at least about 2 μm apart in the uncovered zone 7 of the substrate 3. The window 9 overlies the micro-prisms 13 such that light reflected off the inclined face 15 is directed towards the window 9. In FIGS. 1, 2 and 3 the first face 15 and rear face 17 of each micro-prism 13 extends parallel to the ends 19, 21 of the substrate 3. It is however possible for the first face 15 and rear face 17 of the micro-prisms 13 to be orientated at other angles with respect to the ends 19, 21 of the substrate 3. For example, the first face 15 and rear face 17 of the micro-prisms 13 could extend parallel to opposing longitudinal side edges 23, 25 of the substrate 3.

Although the micro-prisms 13 are evenly spaced in FIG. 3, the micro-prisms 13 can instead be randomly spaced and/or only located in specific regions of the uncovered zone 7. As a result, light transmitted out of specific areas of the window 9 may be of greater intensity compared with other areas of the window 9, thereby providing a contrast enhancement within areas of the window 9. In addition, the micro-prisms 13 may be arranged in groups at different locations within the security document 1. In this regard, each group of micro-prisms 13 may be associated with a corresponding window 9 and uncovered zone 7. Accordingly, light may be transmitted into or out of one or more windows 9 located at various regions of the security document 1.

Between the inclined face 15 and rear face 17 of each micro-prism 13 is a gap 16 into which surrounding air may flow. The inclined face 15 effectively provides a first interface between the substrate 3 and the air within the gap 16. Similarly, the rear face 17 effectively provides a second interface between the air within the gap 16 and the substrate 3.

The refractive index of a substrate 3 of polymeric material such as polypropylene, is approximately 1.57 and the refractive index of air is approximately 1.0. Accordingly, light propagating within the substrate 3 from the first end 19 to the second end 21 of the substrate 3, which is incident on the inclined face 15 at an angle greater than 39.6 degrees (the critical angle) to the normal of the first interface is reflected at the first interface towards the window 9.

Similarly, light propagating within the substrate 3 from the first end 19 to the second end 21 of the substrate 3, which is incident on the inclined face 15 at angles less than 39.6 degrees (the critical angle), is refracted away from the normal of the first interface and towards the rear face 17 of the micro-prism 13. As a result, the light refracted at the first interface will be more parallel to the opacifying layers 5, 6 than the light incident on the inclined face 15. The light refracted at the first interface which is subsequently incident on the rear face 17 of the micro-prism 13, is refracted towards the normal of the second interface. The net effect of light passing through the inclined face 15 and the rear face 17 is that the resulting light is more parallel to the opacifying layers 5, 6. Accordingly, upon reaching the next micro-prism 13 the light incident on the inclined face 15 is now at an angle greater than 39.6 degrees (the critical angle) and is accordingly reflected at the first interface. The following calculation demonstrates this net effect for light incident on the inclined face 15 at an angle of 25 degrees with respect to the normal of the first interface.

Refractive index of substrate $n_{substrate}=1.57$

Refractive index air $n_{air}=1.00$

Angle of incidence $\theta_i=25°$

Snell's Law: $n_i \sin(\theta_i)=n_r \sin(\theta_r)$

For refraction from substrate to air, $n_i=n_{substrate}$, $n_r=n_{air}$ $$\theta_r = \sin^{-1}(n_i \sin(\theta_i)/n_r)$$

$$= \sin^{-1}(1.57\sin(25°))$$

$$= 41.6°$$

With the rear face 17 perpendicular to the opacifying layers 5,6 and the inclined face 15 at an angle θ with respect to the opacifying layers 5, 6, light refracted from the inclined face 15 at angle $\theta_r$ will be incident on the rear face 17 at an angle $\theta_i'=90-\theta-\theta_r$ from the normal of the second interface. Therefore:

$$\theta_i' = 90 - 45 - 41.6$$
$$= 3.4°$$

Applying Snell's Law again, this time with $n_i'=n_{air}$, $n_r'=n_{substrate}$ $$\theta_r' = \sin^{-1}(n_i'\sin(\theta_i')/n_r')$$
$$= \sin^{-1}(\sin(3.4°)/1.57)$$
$$= 2.2°$$

Thus after passing through the first and second interface the light is substantially parallel to the opacifying layers 5, 6 and will be incident on the inclined face 15 of the next micro-prism 13 at an angle greater than the critical angle. Accordingly, almost total internal reflection at the inclined face 15 of the next micro-prism 13 is expected. Summed over the array of micro-prisms 13 embossed into the surface of the substrate 3, the micro-prisms 13 additionally boost the amount of light directed out of the window 9.

In order to enable each micro-prism 13 to capture more light propagating through the substrate 1 the inclined face 15 is spaced away from the sides of the substrate 1 by a distance. In this regard, each micro-prism 13 is provided with a shoulder 27 extending perpendicular to the opacifying layers 5, 6. In general the height (c) of the shoulder 27 of the micro-prism 13 plus the width (a) of each micro-prism 13 is equivalent to the height (b) of the rear face 17. In addition, the height of the shoulder 27 is approximately equivalent to the spacing between each micro-prism 13.

In one preferred embodiment, the width (a) of each micro-prism 13 may fall substantially within the range from about 2 μm to about 20 μm, the height (c) of the shoulder 27 may be about 2 μm resulting in a height (b) of the rear face falling substantially within the range from about 4 μm to about 22 microns. Further, in a preferred embodiment, the height of each micro-prism 13 may fall substantially in the range from about a third to about a half of the thickness of the substrate 3.

The micro-prisms 13 are preferably applied to the substrate 3 by embossing. In this regard, an embossing tool, having an inverse structure of the array of micro-prisms 13, is utilised. The embossing tool can be made through a number of methods, including, for example, electron beam writing, laser micro-machining or lithographic etching techniques.

In a further embodiment, the inclined face 15 may be coated with a reflective material, such as a metallic ink. The coating results in the inclined face 15 being more reflective, thereby increasing the amount of light reflected back into the substrate 3 at the first interface. Alternatively the gap 16 between the inclined face 15 and the rear face 17 could be filled with the reflective material.

In yet another embodiment, the gap 16 between the inclined face 15 and rear face 17 of each micro-prism 13 may be filled with a material having a low refractive index compared with the refractive index of the substrate 3.

The present invention advantageously provides a security document whereby the authenticity of the document can be verified in a simple and convenient manner without specialised detection and analysis equipment. In this regard, the micro-prisms, in combination with the opacifying layers and uncovered portions, enable light which would otherwise be emitted from the edges of the security document to be transmitted out specific areas of the security document. Further, the light transmitted out of the specific areas can be of greater intensity, compared with other areas, thereby providing a contrast enhancement visible to an observer. As the present invention may be embodied in several forms without departing from the central characteristics of the invention, it should be understood that the above-described embodiment should not be considered to limit the present invention but rather should be construed broadly. Various modifications and equivalent arrangements are intended to be included within the spirit and scope of the invention. For example, although the preferred embodiment is described with reference to visible light, it will be appreciated that other forms of electromagnetic radiation outside the visible spectrum, such as infrared radiation and ultraviolet (UV) light may be directed by the micro-prisms. Further, the shape of each micro-prism 13 should not be limited to the specific shape illustrated in the Figures as other shapes are conceivable, for example the micro-prisms 13 could be V-shaped in cross section.

The invention claimed is:

1. A security document including a substrate of transparent polymeric material, and opacifying layers provided on opposing sides of the substrate, the opacifying layers acting to guide light propagating within the substrate, wherein the substrate is formed with at least one micro-prism for diverting light propagating within or entering the substrate.

2. The security document as claimed in claim 1 wherein the substrate is formed with a plurality of micro-prisms.

3. The security document as claimed in claim 2 wherein the opacifying layer on one side of the substrate only partially covers the substrate to form a window.

4. The security document as claimed in claim 3 wherein the opacifying layer on the opposing side of the substrate only partially covers the substrate to leave an uncovered zone, the substrate within the uncovered zone being formed with the plurality of micro-prisms.

5. The security document as claimed in claim 3 wherein the micro-prisms are arranged to divert light propagating within the substrate out of the window.

6. The security document as claimed in claim 2 wherein each micro-prism includes an inclined face at an acute angle with respect to opposing sides of the substrate.

7. The security document as claimed in claim 6 wherein the acute angle falls substantially within the range from about 30 degrees to about 60 degrees.

8. The security document as claimed in claim 6 wherein the inclined face provides a first interface between the substrate and air.

9. The security document as claimed in claim 2 wherein the height of the micro-prisms falls substantially within the range from about 4 μm to about 22 μm.

10. The security document as claimed in claim 2 wherein adjacent micro-prisms are at least about 2 μm apart.

11. A method of determining a characteristic of a security document, the method including the steps of:

(a) providing a security document as claimed in claim 1;

(b) projecting light from a light source into the substrate of the security document;

(c) detecting a light emission of the substrate; and (d) analyzing one or more characteristics of the light emission to determine a characteristic of the security document.

12. The method, as claimed in claim 11, wherein step (c) includes detecting the intensity or integrity of the light emission from a window or edge of the security document.

13. A security document including a substrate of transparent polymeric material, and opacifying layers provided on opposing sides of the substrate, the opacifying layers acting to guide light propagating within the substrate, the substrate being formed with a plurality of micro-prisms for diverting light propagating within the substrate or entering the substrate, each micro-prism including an inclined face at an acute angle with respect to opposing sides of the substrate, the inclined face providing a first interface between the substrate and air, wherein light propagating within the substrate, which is incident on the inclined face at an angle greater than a critical angle, is reflected at the first interface.

14. The security document as claimed in claim 13 wherein the opacifying layer on one side of the substrate only partially covers the substrate to form a window.

15. The security document as claimed in claim 14 wherein the opacifying layer on the opposing side of the substrate only partially covers the substrate to leave an uncovered zone, the substrate within the uncovered zone being formed with the plurality of micro-prisms.

16. The security document as claimed in claim 14 wherein the micro-prisms are arranged to divert light propagating within the substrate out of the window.

17. The security document as claimed in claim 13 wherein the acute angle falls substantially within the range from about 30 degrees to about 60 degrees.

18. A security document as claimed in claim 13 wherein each micro-prism includes a second face substantially perpendicular to the opposing sides of the substrate.

19. A security document as claimed in claim 18 wherein the second face provides a second interface between air and the substrate.

20. A security document as claimed in claim 19 wherein light propagating within the substrate, which is incident on the inclined face at an angle less than the critical angle, is refracted away from the normal of the first interface and towards the second face of the micro-prism.

21. A security document as claimed in claim 20 wherein light refracted towards the second face of the micro-prism, which is incident on the second face, is refracted towards the normal of the second interface.

22. A security document as claimed in claim 21 wherein light refracted at the second interface of the micro-prism propagates within the substrate substantially parallel to the opposing sides of the substrate.

23. A security document as claimed in claim 22 wherein the light refracted at the second interface, which is incident on the inclined face of an adjacent micro-prism at an angle less than the critical angle, is reflected at the inclined face of the adjacent micro-prism.

24. A security document as claimed in claim 13 wherein the height of the micro-prisms falls substantially within the range from about 4 μm to about 22 μm.

25. A security document as claimed in claim 13 wherein adjacent micro-prisms are at least about 2 μm apart.

26. A security document including a substrate of transparent polymeric material, and opacifying layers provided on opposing sides of the substrate, the opacifying layer on one side of the substrate only partially covering the substrate to form a window, the opacifying layers acting to guide light propagating within the substrate, wherein the substrate is formed with a plurality of micro-prisms for diverting light propagating within or entering the substrate, wherein the micro-prisms are arranged to direct light incident on the window to propagate along the substrate.

* * * * *